May 18, 1965  J. T. PRATT  3,183,652
LAWN MOWING AND TRIMMING APPARATUS
Filed Nov. 25, 1964  2 Sheets-Sheet 1

INVENTOR.
JOHN T. PRATT
BY *Wm. T. Wofford*
ATTORNEY

May 18, 1965 J. T. PRATT 3,183,652
LAWN MOWING AND TRIMMING APPARATUS
Filed Nov. 25, 1964 2 Sheets-Sheet 2

INVENTOR.
John T. Pratt
BY Wm. T. Wofford
Attorney 3,183,652
LAWN MOWING AND TRIMMING APPARATUS
John T. Pratt, 511 Tierney Road, Fort Worth, Tex.
Filed Nov. 25, 1964, Ser. No. 415,853
6 Claims. (Cl. 56—25.4)

My invention relates to powered lawn mowing and trimming apparatus and more particularly to improved lawn trimmer apparatus of the type which is mountable upon a powered lawn mower and utilizes the lawn mower power source. This application is a continuation-in-part of my copending application, Serial No. 253,839; filed January 25, 1963 and now abandoned.

Self-contained powered lawn trimming and edging devices are in common use. The more satisfactory types of these are quite expensive, often costing nearly as much as a powered lawn mower. Less expensive types of these devices are powered by small motors so that the cutter elements are driven at undesirably high speeds, and their overall effectiveness is less than satisfactory. Some attempts have been made to provide lawn trimming and edging apparatus which is either combined with or mountable on a powered lawn mower so as to utilize the mower power source. This latter type apparatus offers a most promising solution to the problem of achieving a satisfactory trimming and edging apparatus at a reasonable cost. However, such apparatus, if it is to be satisfactory must exhibit several important attributes. It must be a relatively simple structure which is economical to manufacture and it must be rugged and durable. It must be easily controlled and have a desirable degree of maneuverability. The cutter blade vertical position must be easily and accurately controllable, especially when edging, and the cutter blade must be easily movable from the edging to the trimming position. The cutter blade drive arrangement must be efficient and effective. The trimming apparatus should not adversely affect the normal operation of the lawn mower and vice versa. The trimmer assembly must be quickly and easily mountable and demountable on and off the lawn mower.

Accordingly, it is an object of the present invention to provide an improved lawn trimmer apparatus which is mountable on a powered lawn mower.

Another object of the invention is to provide an improved type lawn trimmer apparatus that is readily adaptable for mounting on most types of power lawn mowers.

Another object of the invention is to provide an improved lawn trimmer apparatus which is mountable on a powered lawn mower and wherein a trimmer assembly may be readily and easily mounted to and demounted from the lawn mower.

Another object of the invention is to provide a simple effective mechanism for driving the cutter blade of the trimmer apparatus from the lawn mower power mechanism.

Another object of the invention is to provide, for a powered lawn mower, an improved lawn trimmer apparatus that is simply and effectively pivotable and movable relative to the plane of the lawn mower cutter blade.

These and other objects are effected by my invention as will be apparent from the following description taken in accordance with the accompanying drawings, forming a part of this application, in which:

FIG. 1 illustrates a typical rotary-type power lawn mower 11 whereon is mounted a lawn trimmer apparatus 13, in accordance with a preferred embodiment of my invention.

Figure 2:
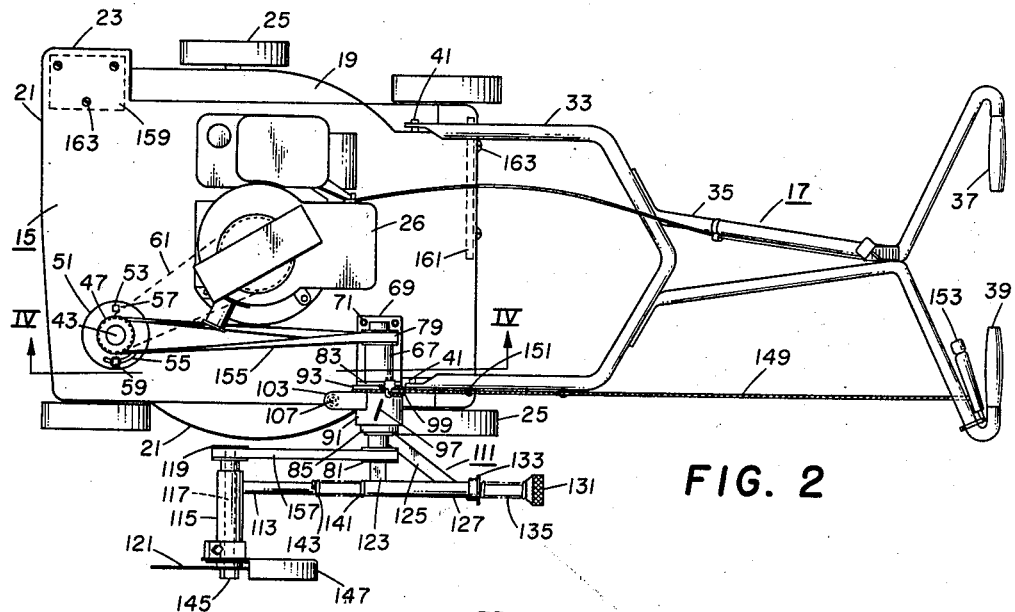
FIG. 2 is a schematic plan view of the apparatus of FIG. 1.
Figure 1:
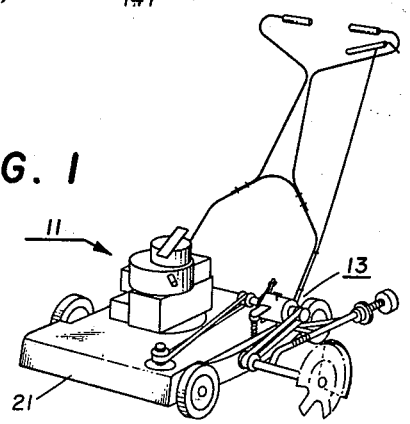
FIG. 1 is a schematic perspective view of a lawn trimmer apparatus, in accordance with a preferred embodiment of the present invention, showing the same mounted on a rotary-type power lawn mower.
Figure 4:
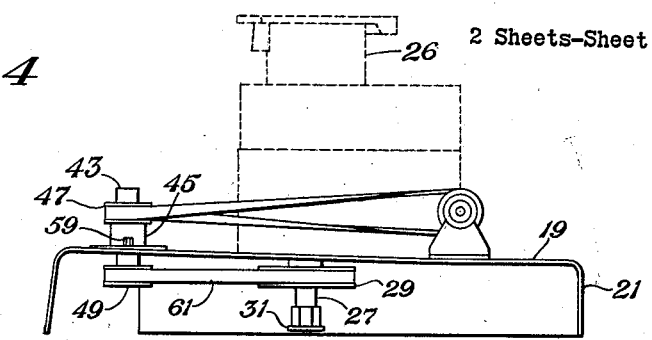
FIG. 4 is a sectional view taken at line IV—IV of FIG. 2.

The powered lawn mower 11 is of the conventional rotary-type having a chassis 15 and a handle 17 pivotally connected thereto. The chassis 15 includes a generally rectangular plate 19 which is disposed at a convenient variable distance above and substantially parallel to the plane of the ground, or other supporting surface. A skirt 21 is fixed to and depends from the peripheral edge of the plate 19; the skirt being discontinuous for a portion of its length, thereby providing a discharge opening 23 for grass and other like cuttings. The chassis 15 is supported on opposite sides by wheels 25 which are suitably mounted on axles adjustably fixed to the skirt 21. The plane of the bottom of the wheels is generally parallel to and spaced apart from the plane of the bottom of the skirt 21; thus, the chassis 15 is movably supported. A source of power in the form of an internal combustion engine 26, or which may be an electric motor with a gear reduction, or the like, is mounted on the upper surface of the plate 19. A powered drive shaft 27 projects downwardly from the engine 26 or power source, through an opening in the central region of the plate 19. A V-belt type drive pulley 29 is fixedly mounted on the shaft 27 just beneath the plate 19, about as shown in FIG. 4, and a mower blade 31, which may be of conventional form, is demountably secured to the lower end of the shaft 27 for rotation in a horizontal plane at a fixed level beneath the top plate 19. The handle 17 comprises a bifurcated lower portion 33 and an upper portion 35 which is bifurcated at both ends; one such end being fixed to the lower portion, as shown in FIG. 2. The free ends of the upper portion 35 are formed toward each other and comprise handle grips 37, 39. The ends of the bifurcated lower portion 33 are pivotably connected to the chassis 15 by pivot pins 41 projecting outwardly therefrom, as shown in FIG. 2.

A vertical drive-shaft 43 is journaled in a thrust-type bearing 45 which is adjustably mounted on the upper surface of the plate 19. The shaft 43 projects above the bearing 45 and downward through an enlarged opening in the plate 19, into the region beneath it. A V-belt drive pulley 47 is fixedly mounted on the upper end of the shaft 43 and another similar pulley 49 is fixedly mounted on the lower end of the same shaft. The bearing 45 has a flange 51 which adjoins the plate 19 and in which there is a hole 53. In opposition to the hole 53, there is an elongated arcuate slot 55 in the flange 51, as shown generally in FIG. 2. The hole 53 and slot 55 match with a pair of holes (not shown) in the plate 19. A pair of bolt-type fasteners 57, 59, or other suitable fastener devices, project through the flange 51 and plate 19 and engage nuts, or other suitable devices, to secure the bearing 45 and the shaft 43 in a selected location. In a preferred embodiment of my invention, the shaft 43 is located near the left side of the mower, opposite the discharge opening 23, and as near to the front end skirt 21 as is conveniently possible. This is for a purpose to be explained hereinafter. For convenient reference hereinafter, the left-hand end of the mower 11, as viewed in FIG. 2, is designated the front end; the right-hand end is the rear end; the far side is the right side; and the near side is the left side. A V-type drive belt 61 operatively connects the drive pulley 29 and the driven pulley 49; the drive pulley 29 being preferably about twice the size of the driven pulley 49. However, this ratio is not considered to be critical and other ratios of pulley sizes may be used if desired.

Figure 3:
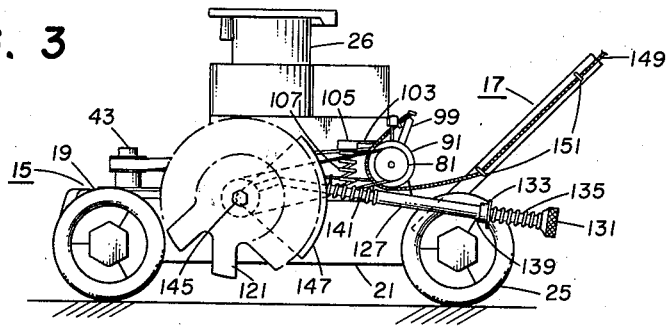
FIG. 3 is a schematic side elevational view of the apparatus of FIG. 1 showing the trimmer apparatus in one operative position.

A trunnion mounting 63 is fixed to a support 65 which is secured to the plate 19, near the left side of the mower, just in front of the left rear wheel. The trunnion mounting 63, shown most clearly in FIG. 5, includes a first cylindrical tube or tubular member 67 which is disposed in a generally horizontal plane with its axis substantially perpendicular to the plane of the longitudinal central axis of the mower 11. The tube 67 is fixed and maintained in position above the plate 19 by the support structure 65. The support structure 65 comprises an angular shaped bracket 69, the upright leg 70 of which is welded, or otherwise suitably fixed, to the tubular member 67; the horizontal leg 72 being attached to the plate 19 by bolts 71, or in another suitable manner. One end of an intermediary strut or plate 73 is secured, as by welding, to the tube 67, and the other end to the horizontal leg 72 of the angular bracket 69 in the same manner. The tubular member 67 (sometimes herein referred to simply as the tube 67) is long enough to overhang the side skirt 21 and to extend inwardly a short distance beyond the intermediary strut 73. A respective bearing 75 is disposed, and is maintained, in any suitable manner, within the tube 67, adjacent each end thereof. A shaft 77 extends through the tube 67 and is journaled in the bearings 75. Upon the respective inner and outer ends of the shaft 77, V-belt type pulleys 79, 81 are mounted and secured thereto by a set-screw 82, or in any other suitable manner. A collar 83 surrounds the tube 67 and is fixed thereto, as by welding, adjacent the bracket 69. Another collar 85 surrounds and is similarly fixed to the tube 67, adjacent the outer end of the tube 67. A second tubular member 87 surrounds the portion of the first tube 67 which is between the collars 83, 85. The second tubular member 87 (sometimes referred to herein simply as the second tube 87) is disposed to freely rotate upon the first tube 67 and is conveniently maintained in a fixed longitudinal position, along the tube 67, by the collars 83, 85. Thus, the collars 83, 85, fixed to the first tubular member 67 serve as means for maintaining the second tubular member 87 in a predetermined position with respect to the first tubular member 67. A shallow circumferential groove 89 is provided in the outer surface of the second tube 87, for a purpose to be hereinafter explained. A third tubular member 91 (not a part of the trunnion mounting 63) is journally mounted on the second tube 87 so as to freely rotate with respect to it; the inside diameter of the third tubular member 91 (sometimes herein referred to simply as the third tube 91) being slightly greater than the outside diameter of the collar 85 and the pulley 81. The inner end of the third tube 91 is provided with a narrow collar 93 which is affixed thereto by welding, or in any other suitable manner. The collar 83 has an outside diameter which is conveniently made substantially equal to the mean of the outside and inside diameters of the third tube 91. Thus, the collar 83 forms an effective stop against which the inner end of the third tube 91 bears. There is provided in the wall of the third tube 91 a threaded radial hole 95, which is in substantially matching relation with the groove 89. A thumbscrew 97 threadedly engages the hole 95 and projects into the groove 89 when the thumbscrew 97 is extended toward the tube 87. Thus the thumbscrew 97 cooperating with the third tubular member 91 and the groove 89 in the second tubular member 87 serve as means for securing and maintaining the third tubular member 91 in a selected fixed position with respect to the second tubular member 87. A finger 99 is fixed to and projects outwardly from the outer surface of the tube 91, between the thumbscrew 97 and the collar 93. The outer end of the finger 99 has a notch 101 therein, for a purpose to be explained hereinafter. An arm 103 is fixed substantially tangent to and projects laterally from the surface of the tube 91 at the top of it, as shown in FIG. 3. The free end of the arm 103 is provided with a cup or small receptacle 105 to receive and maintain captive one end of a compression spring 107. The other end of the spring 107 is received and maintained captive in a similar cup or small receptacle (not shown) disposed in matching relation with the cup 105 and fixed to the upper surface of the plate 19.

For convenient reference and to aid in the understanding of the invention, certain terminology is employed herein as follows: the word "trimming" is intended in the broader sense to also include lawn edging operations; the phrase "trimmer apparatus" is intended to include all of the apparatus shown and described herein, except the powered lawn mower; the "trimmer apparatus" includes a "primary drive assembly" and a "trimmer assembly"; the "primary drive assembly," includes drive pulley 29, dive shaft 43 and associated parts including pulleys 47, 49, trunnion mounting 63 and support 65, and drive belts 61, 155; and the "trimmer assembly" includes basically a supporting bracket 111 fixed to the tube 91; a rod or arm 113 journaled in the bracket 111; a housing 115 fixed to one end of the arm 113; and a trimmer blade shaft 117 supporting a pulley 119 and an edger or trimmer blade 121; with the shaft 117 being journaled in the housing 115. Thus, the housing 115 and the arm 113 may be regarded as support means for the trimmer blade 121 and the trimmer blade shaft 117.

The support bracket 111 includes a pair of rectangular tubular leg members 123, 125 which are welded to each other and to a cylindrical tubular leg member 127 so as to form a right triangle. The tubular leg member 127, is substantially perpendicular to the longitudinal axis of the trunnion mounting 63. At the apex of the bracket 111, where the legs 123, 125 join, there is a short strut 129 which is fixed, as by welding, to the legs 123, 125 and to the third tube 91. Thus, the bracket 111 is disposed and maintained in fixed spaced relation to the longitudinal axis of the trunnion mounting 63. The arm 113 is suitably journaled in the tubular leg member 127 and extends from each end thereof. Thus, the bracket 111 and the tubular leg member 127 may be regarded as linkage means connected to the third tubular member 91 and the trimmer blade shaft support means and maintaining same in relative fixed positions. At the rear end of the arm 113, there is a fixed knurled knob 131 by means of which the arm 113 may be manipulated. Between the knob 131 and the rear end of the tubular member 127, there is another knob 133. A compression spring 135, which surrounds the arm 113, is disposed between the knobs 131, 133 and abuts against them at each end. The front end surface of the knob 133, which abuts against the rear end of the tubular leg member 127, is provided with a plurality of slots 137 which engage and coact with a short spline 139 fixed to and extending from the lower surface of the tubular leg 127. The knob 133 is keyed to the arm 113 so that it may reciprocate therealong, but may not turn with respect to the arm. Another compression spring 141 surrounds and is fixed, at its front end, to the arm 113 by a pin 143, or in another suitable manner. The other or rear end of the spring 141 abuts against the front end of the tubular leg member 127 and maintains the arm 113 in a selected longitudinal relation with respect to the tubular leg member 127. The front end portion of the arm 113 is fixed to the housing 115 which is disposed substantially perpendicular to the axis of the arm 113. The pulley 119 is secured to the inner end of the trimmer blade shaft 117 so as to be in alignment with the pulley 81 on the outer end of the shaft 77. The edger (for trimmer) blade 121 is secured to the outer end of the shaft 117 by a nut 145 and is protected by a suitable guard structure 147. One end of a flexible wire cable 149 is wrapped partly around the outer surface of the third tube 91, on the front arcuate portion thereof, between the collar 93 and the finger 99. This end of the wire cable 149 has a loop formed therein which engages and cooperates with the notch 101 in the finger 99. The other end of the cable 149 is threaded through a plurality of loops 151 fixed at convenient intervals to the handle 17 and is connected to a handle 153 which is pivotally fastened, in any suitable manner, adjacent the handle grip 39.

A V-belt 155 operatively connects the drive pulley 47 (it being driven by the pulley 49) and the driven pulley 79. This belt 155, of course, is necessarily twisted, as shown in FIG. 2, since the respective drive and driven pulleys 47, 79 rotate about mutually perpendicular axes. Location of the vertical drive shaft 43 a convenient distance away from the horizontal shaft 77 assures that the V-belt 155 will operate effectively in all respects. Another V-belt 157 operatively connects pulleys 81 and 119.

The edger blade 121, therefore, is caused to rotate in a counterclockwise direction, as viewed from the blade end of the shaft 117, when the mower blade 31 rotates in a normal clockwise direction, as viewed from above the mower blade.

In order to effectively balance the weight of the lawn trimmer apparatus 13, which is preferably mounted on the left side of the lawn mower 11, it has been found desirable to removably secure counterbalance weights on the right side of the mower 11. For such purpose a plate 159 or other suitable weight object, is removably secured to the underneath of the top plate 19 and a similar plate 161 or object is removably secured to the front surface of the rear skirt 21. The plates 159, 161 may be of any convenient size and shape and may be secured to the top plate 19 and skirt 21 by machine screws 163, or in any other suitable manner. The aggregate weight and disposition of the plates 159, 161 effectively counterbalances the weight of the lawn trimmer apparatus 13, so that a substantially equal load is supported by each wheel 25.

Now, while in a preferred embodiment of my invention I have used V-belt pulleys and V-belts to operatively connect the edger blade to the lawn mower engine or power mechanism, it is to be clearly understood that other suitable operative and connective means, such as chains and sprockets and the like, may be used if desired.

In order to describe the manner in which the trimmer apparatus 13 is used, reference may be made to FIGS. 2 and 3. It will be assumed that the trimmer apparatus has been properly mounted and connected, as shown in FIG. 2. Hereinafter, the necessary steps to demount the trimmer assembly will be described; it being understood that the steps to mount trimmer assembly are the reverse of the steps to demount same.

It will be observed, from FIG. 2, that, when the lawn mower engine is started preparatory to trimming and edging, the lawn mower blade turns clockwise and the edger blade 121 turns counterclockwise. In its normal position, the edger blade 121 does not engage the lawn, it being maintained in the upward pivoted position, as shown generally in FIG. 3, by the spring 107 acting on the arm 103. However, when it is desired to cut along the edge of the lawn, the edger blade may be pivoted downward by simply manipulating the handle 153. Moving the handle 153 toward the handle grip 39 exerts a tensile force in the wire cable 149 which, in turn, exerts a tensile force on the finger 99. This tensile force, acting in the direction of the wire 149, has a force component which acts perpendicularly to the finger 99. This force component urges the third tube 91, the bracket 111 and, thus, the edger blade to pivot counterclockwise about the axis of the trunnion mounting 63, as viewed in FIG. 3. It will be readily understood that the rotating edger blade may, in this simple manner, be pivoted into engagement with the grass at the edge of a lawn, to various selected depths. The edger blade may, of course, be guided along the edge of the lawn by manipulating the lawn mower 11, as necessary.

The trimmer assembly may be easily and quickly demounted in the following manner: The thumbscrew 97 is first retracted so that the end of it does not engage the groove 89; the cable 149 is disconnected from the finger 101; and the spring 107 is removed from its captive engagement in the cups 105, 109. The V-belt 157 must also be removed from the pulleys 81 and 119 and this may be easily done by turning the edger blade 121 and shaft 117 through an angle of about 45° from a vertical position, which is readily done by grasping the knob 133 and moving it toward the fixed knob 131. This movement disengages the spline 139 from the slot 137. The arm 113 and edger blade 121 may then be pivoted freely by turning the knob 133. When the desired orientation of the blade is obtained, the knob 133 may be released and the spline 139 will then engage another slot 137 to maintain the edger blade in the selected orientation. After the V-belt 157 has been removed, it is a simple matter to remove from the trunnion 63 the third tube 91, the bracket 111 and all the apparatus supported thereupon. The third tube may be moved axially to the left with respect to the fixed first and second tubes, and over the pulley 81. Thus, the trimmer assembly is easily and simply removed from the trunnion mounting 63.

Figure 5:
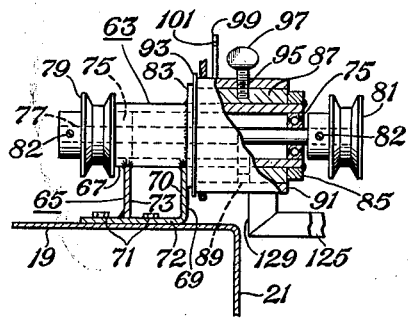
FIG. 5 is a detail of the trunnion mounting and support for the trimmer assembly.

In the trunnion mounting 63, as shown by FIG. 5 of the drawings, the second tubular member 87 has been regarded as separate from and rotatable on the first tubular member 67, with the third tubular member 91 being releasably fixed to the second tubular member 87 by means of the thumbscrew 97.

It should be understood that, if desired, the second tubular member 87 could be made integral with the first tubular member 67, with the thumbscrew 97 being retained within the groove 89 but not bearing on the bottom thereof, so that the third tubular member 91 is free to rotate on the second tubular member 87, but is releasably restrained against movement longitudinally thereof. This modified form of the trunnion mounting 63 is shown by FIG. 8 of the drawings, wherein all reference numerals are identical with and refer to the same parts as in FIG. 5, with the exception that reference numerals 67, 87, and 91 have been omitted; with reference numerals 67 and 87 which in FIG. 5 referred to first and second tubular members being replaced by a single reference numeral 88 which is applied to what may be referred to as the modified first tubular member 88; and with reference numeral 91 which in FIG. 5 referred to the third tubular member being replaced by reference numeral 92 which is applied to what may be referred to as the modified second tubular member 92.

Figure 8:
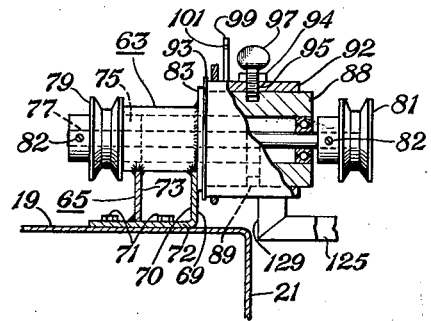
FIG. 8 is a detail of a modified form of the trunnion mounting and support for the trimmer assembly.
Figure 7:
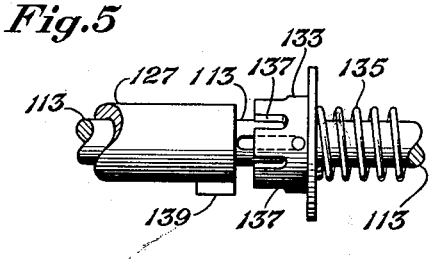
FIG. 7 is a detail of the trimmer assembly arm positioning mechanism.

Thus it is clear that in the modified trunnion mounting as shown by FIG. 8, that the thumbscrew 97 coacting with the first and second tubular members 88, 92 may be regarded as means for releasably securing and maintaining the second tubular member 92 in a predetermined longitudinal position relative to the first tubular member 88. Also, the bracket 111 and the tubular leg member 127 may be regarded as linkage means connected to the second tubular member 92 and the trimmer blade shaft support means for maintaining same in relative fixed positions.

In the modified trunnion mounting, a lock nut 94 may be provided to retain the thumbscrew 97 at the desired position within the groove 89.

Figure 6:
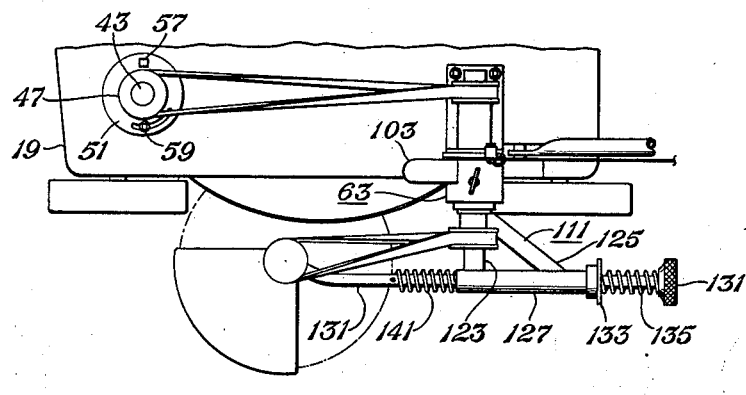
FIG. 6 is a schematic plan view of a fragment of the lawn mower showing the trimmer apparatus, mounted thereon, in another operative position.

Should it be desired at any time for some trimming operations, the blade 121 may be pivoted, after the manner described hereinbefore, to the horizontal position, as shown in FIG. 6.

It should be noticed that when the trimmer assembly is demounted, the primary drive assembly constitutes a convenient power take-off mechanism which may be readily employed in various applications, it being only necessary to connect a drive belt from the pulley 81 to the input pulley of the device to be driven.

It will be apparent to those skilled in the art that the lawn trimmer apparatus of my invention embodies to a high degree all of the important attributes hereinbefore mentioned. The outstanding facility with which the trimmer assembly may be mounted and demounted is of particular significance. Also of special note is the simplicity and effectiveness of the trimmer cutter blade vertical position control, and of the primary drive assembly.

The foregoing disclosure and the showings made in the drawings are merely illustrative of the principles of this invention and are not to be interpreted in a limiting sense.

I claim:

1. The combination with a powered lawn mower having a chassis and a power source of a driven lawn trimmer apparatus comprising: a first tubular member fixedly mounted to said chassis with the longitudinal axis of said tubular member disposed perpendicularly to the vertical longitudinal plane of said mower; a second tubular member rotatably mounted on said first tubular member; means fixed to said first tubular member and coacting with said second tubular member for maintaining said second tubular member in a predetermined position with respect to said first tubular member; a third tubular member slidably mounted on said second tubular member; means coacting with said second and third tubular members for securing and maintaining said third tubular member in a selected fixed position with respect to said second tubular member; a trimmer blade shaft; a trimmer blade mounted to said shaft for rotation therewith; support means for said trimmer blade shaft disposed with said shaft journaled in a portion of said support means with the axis of said shaft parallel to and spaced laterally from said longitudinal axis of said first tubular member; linkage means connected to said third tubular member and said trimmer blade shaft support means and maintaining same in relative fixed positions; and drive means interposed between said power source and said blade shaft and including a driving shaft journaled in and passing through said first tubular member.

2. The combination with a powered lawn mower having a chassis and a power source of a driven lawn trimmer apparatus comprising: a first tubular member fixedly mounted to said chassis with the longitudinal axis of said tubular member disposed perpendicularly to the vertical longitudinal plane of said mower; a second tubular member rotatably mounted on said first tubular member; means fixed to said first tubular member and coacting with said second tubular member for maintaining said second tubular member in a predetermined position with respect to said first tubular member; a third tubular member slideably mounted on said second tubular member; means coacting with said second and third tubular members for securing and maintaining said third tubular member in a selected fixed position with respect to said second tubular member; a trimmer blade and blade shaft; support means for said trimmer blade and shaft disposed with said shaft journaled in a portion of said support means with the axis of said shaft parallel to and spaced laterally from said longitudinal axis of said first tubular member; linkage means connected to said third tubular member and said trimmer blade shaft support means and maintaining same in relative fixed positions; and drive means interposed between said power source and said blade shaft.

3. The combination with a powered lawn mower having a chassis and a power source, of a driven lawn trimmer apparatus comprising: a first tubular member fixedly mounted to said chassis with the tubular member longitudinal axis perpendicular to the vertical longitudinal plane of said mower; a second tubular member rotatably and slideably mounted on said first tubular member; means coacting with said first and second tubular members for releasably securing and maintaining said second tubular member in a predetermined longitudinal position relative to said first tubular member; a trimmer blade shaft; a trimmer blade mounted to said shaft for rotation therewith; support means for said trimmer blade shaft disposed with said shaft journaled in a portion of said support means with the axis of said shaft parallel to and spaced laterally from the longitudinal axis of said first tubular member; linkage means connected to said second tubular member and said trimmer blade shaft support means and maintaining same in relative fixed positions; and drive means interposed between said power source and said blade shaft and including a driving shaft journaled in and passing through said first tubular member.

4. The combination with a powered lawn mower having a chassis and a power source, of a driven lawn trimmer apparatus comprising: a first tubular member fixedly mounted to said chassis with the tubular member longitudinal axis perpendicular to the vertical longitudinal plane of said mower; a second tubular member rotatably and slideably mounted on said first tubular member; means coacting with said first and second tubular members for releasably securing and maintaining said second tubular member in a predetermined longitudinal position relative to said first tubular member; a trimmer blade shaft; a trimmer blade mounted to said shaft for rotation therewith; support means for said trimmer blade shaft disposed with said shaft journaled in a portion of said support means with the axis of said shaft parallel to and spaced laterally from the longitudinal axis of said first tubular member; linkage means connected to said second tubular member and said trimmer blade shaft support means and maintaining same in relative fixed positions; and drive means interposed between said power source and said blade shaft and including a driving shaft journaled in said first tubular member.

5. The combination with a powered lawn mower having a chassis and a power source, of a driven lawn trimmer apparatus comprising: a first tubular member fixedly mounted to said chassis with the tubular member longitudinal axis perpendicular to the vertical longitudinal plane of said mower; a second tubular member rotatably and slideably mounted on said first tubular member; means coacting with said first and second tubular members for releasably securing and maintaining said second tubular member in a predetermined longitudinal position relative to said first tubular member; a trimmer blade shaft; a trimmer blade mounted to said shaft for rotation therewith; support means for said trimmer blade shaft disposed with said shaft journaled in a portion of said support means with the axis of said shaft parallel to and spaced laterally from the longitudinal axis of said first tubular member; linkage means connected to said second tubular member and said trimmer blade shaft support means and maintaining same in relative fixed positions; and drive means interposed between said power source and said blade shaft.

6. The combination with a powered lawn mower having a chassis and a power source, of a driven lawn trimmer apparatus comprising: a first tubular member fixedly mounted to said chassis with the tubular member longitudinal axis perpendicular to the vertical longitudinal plane of said mower; a second tubular member rotatably and slideably mounted on said first tubular member; means coacting with said first and second tubular members for releasably securing and maintaining said second tubular member in a predetermined longitudinal position relative to said first tubular member; a trimmer blade shaft; a trimmer blade mounted to said shaft for rotation therewith; support means for said trimmer blade shaft disposed with said shaft journaled in a portion of said support means with the axis of said shaft parallel to and spaced laterally from the longitudinal axis of said first tubular member; linkage means connected to said second tubular member and said trimmer blade shaft support means and maintaining same in relative fixed positions; and drive means interposed between said power source and said blade shaft and including a driving shaft within said first tubular member.

References Cited by the Examiner
UNITED STATES PATENTS

| | | | |
|---|---|---|---|
| 2,707,858 | 5/55 | Norton et al. | 56—25.4 |
| 2,721,432 | 10/55 | Machorec | 56—25.4 |
| 2,739,437 | 3/56 | True | 56—25.4 |
| 2,771,730 | 11/56 | True | 56—25.4 |

ANTONIO F. GUIDA, *Acting Primary Examiner.*
RUSSELL R. KINSEY, *Examiner.*